Sept. 17, 1929.  P. J. LUCICH  1,728,557
FLYING MACHINE
Filed Dec. 29, 1927  6 Sheets-Sheet 4

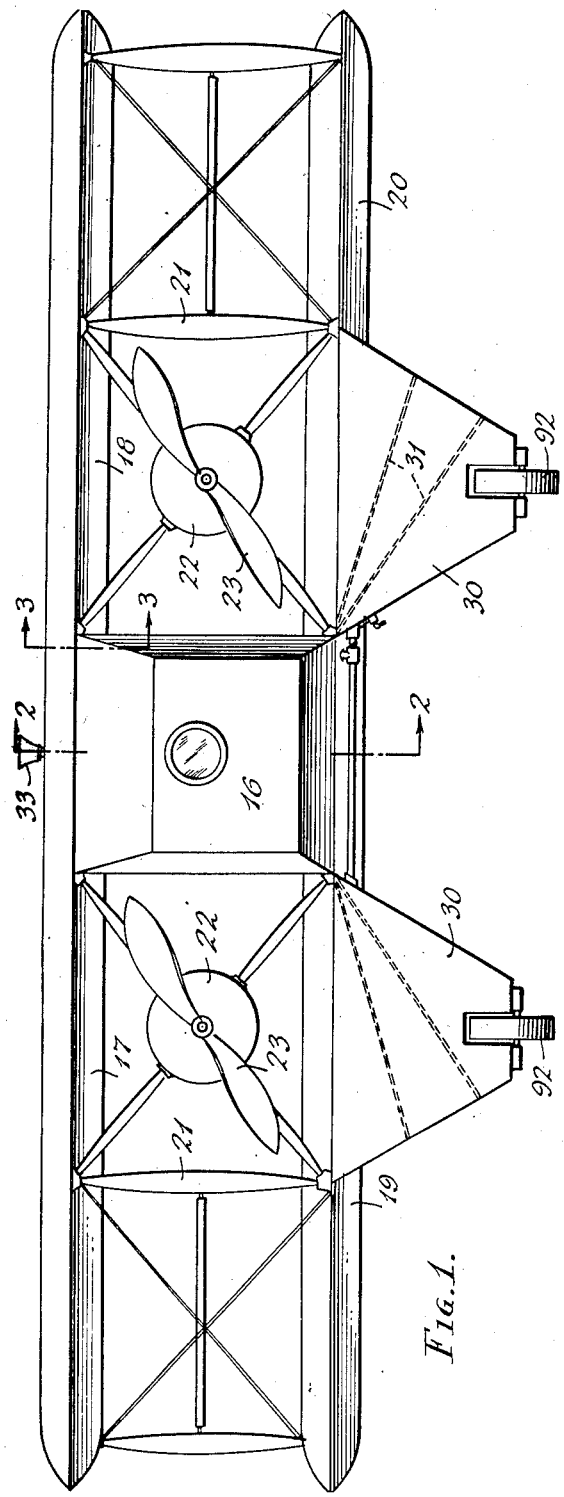
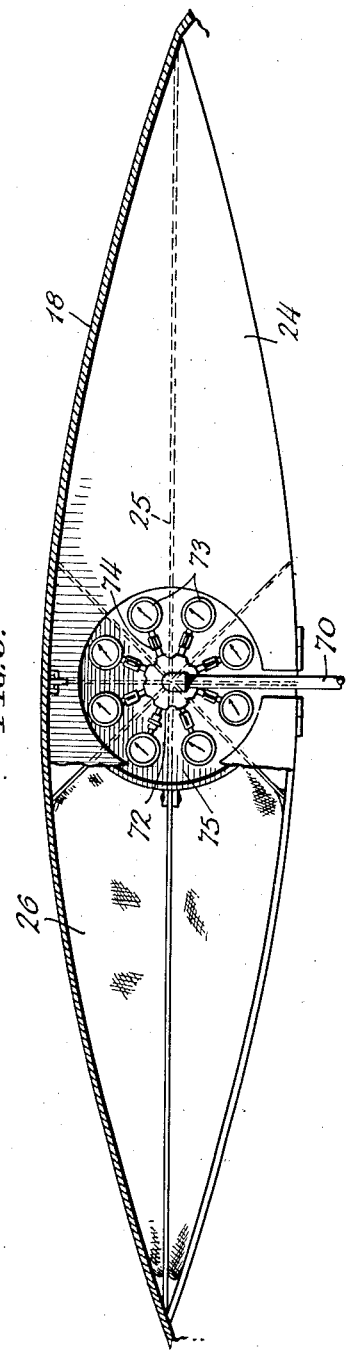

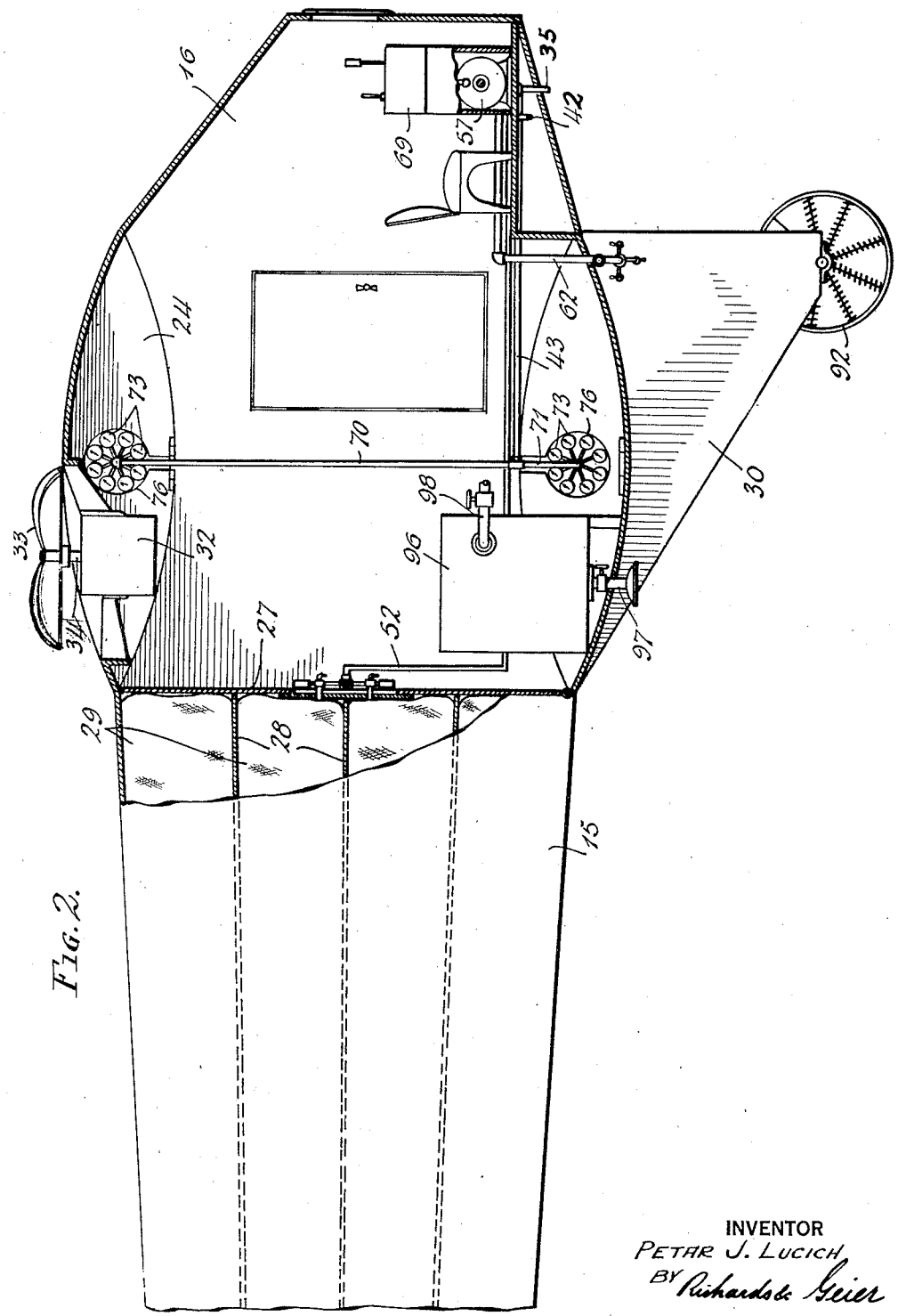

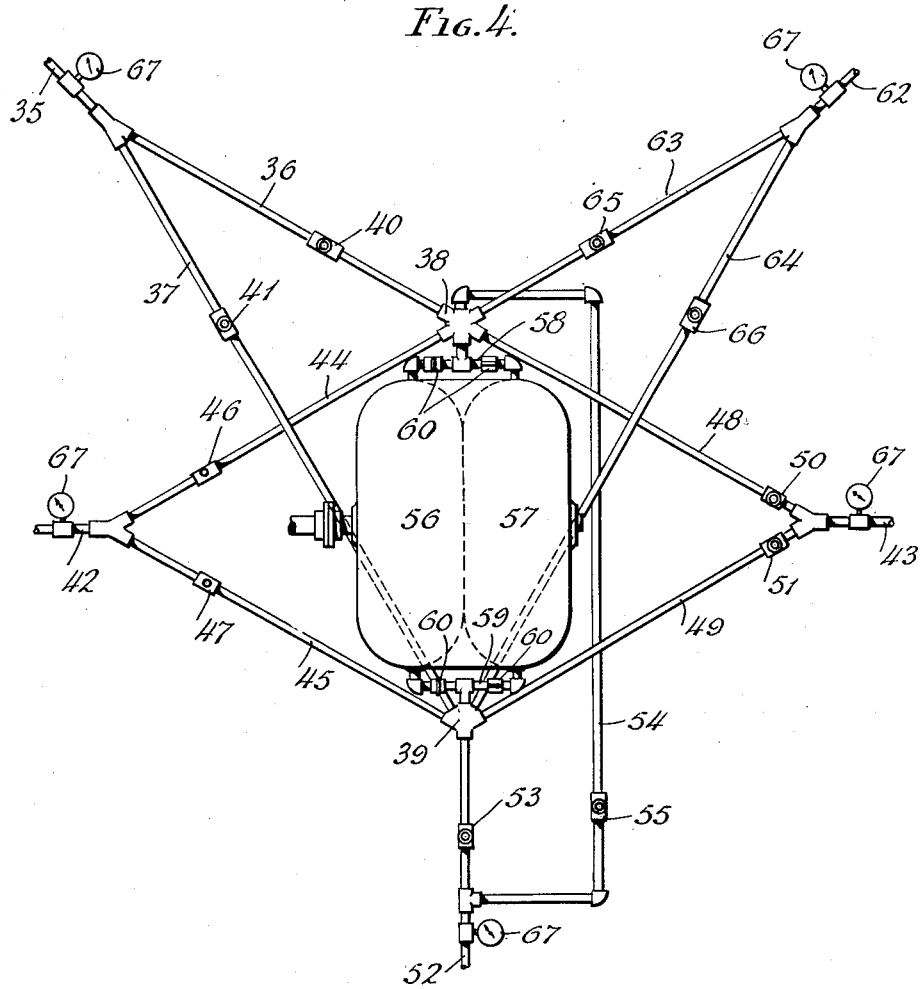

INVENTOR
PETAR J. LUCICH
BY Richards & Geier
ATTORNEYS

Sept. 17, 1929. P. J. LUCICH 1,728,557
FLYING MACHINE
Filed Dec. 29, 1927 6 Sheets-Sheet 5

INVENTOR
PETAR J. LUCICH
BY
ATTORNEYS

Sept. 17, 1929.  P. J. LUCICH  1,728,557
FLYING MACHINE
Filed Dec. 29, 1927  6 Sheets-Sheet 6

INVENTOR
PETAR J. LUCICH
BY Richards & Geier
ATTORNEYS

Patented Sept. 17, 1929

1,728,557

UNITED STATES PATENT OFFICE

PETAR JOHN LUCICH, OF NEW YORK, N. Y.

FLYING MACHINE

Application filed December 29, 1927. Serial No. 243,290.

This invention relates to improvements in flying machines, and has particular reference to an aeroplane.

An object of the invention is to maintain the equilibrium of the machine while in flight by providing a plurality of inflatable elements in the wings of the machine in which a buoyancy medium, such as helium gas, may be stored and which may be transferred from certain of said elements to others when the portion of the machine in which the latter elements are located become sufficiently heavier than the other portions thereof to tilt the machine transversely.

Another object is to connect a plurality of inflatable elements carried in the wings and fuselage of the machine, and storage tanks carried by the machine, with a common source of power which may be utilized to transfer a buoyancy medium in said elements and tanks from one part of the machine to another to maintain the equilibrium thereof.

The above and other objects will appear more clearly from the following detail description, when taken in connection with the accompanying drawings, which illustrate preferred embodiments of the inventive idea.

In the drawings—

Figure 1 is a front elevation of the machine constructed in accordance with the invention;

Figure 2 is a fragmentary longitudinal section taken substantially on the line 2—2 of Figure 1;

Figure 3 is a section taken substantially on the line 3—3 of Figure 1;

Figure 4 is a diagrammatic view of the system of piping utilized in supplying gas to the storage tanks and inflatable elements of the machine and for transferring said gas from one place to another.

Figure 5:
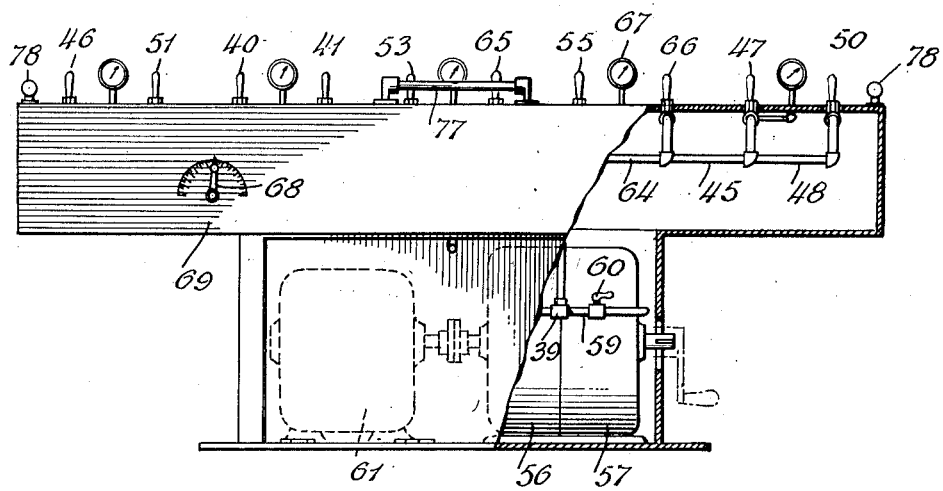
Figure 5 is a front elevation, partly broken away and shown in section, of the control unit for the system of piping.
Figure 6:
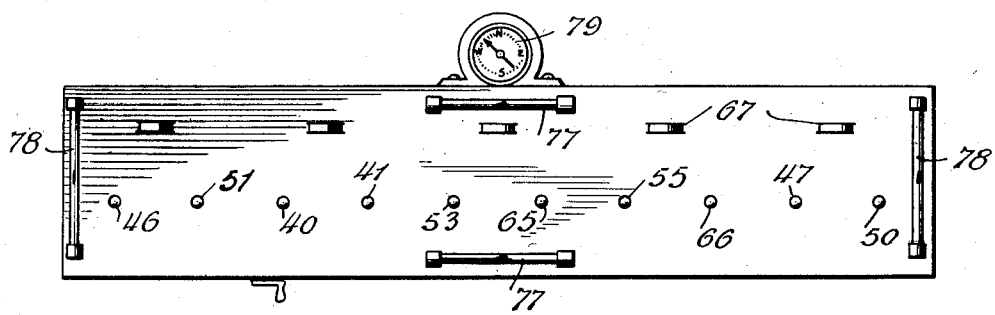
Figure 6 is a top plan view thereof.

Referring more particularly to the drawings, the numeral 15 indicates the fuselage of the machine which includes a forward compartment 16 constituting the cockpit thereof. Extending on opposite sides of the forward portion of the fuselage are the upper wings 17 and 18 and the lower wings 19 and 20, the upper and lower wings being connected by the usual struts 21 to brace the same. Also suspended between the upper and lower wings on opposite sides of the cockpit are engines 22 of any desired type utilized to drive the propellers 23. Each of the wings is of hollow construction having an open inner end closed by a hinged closure 24 and the interior of the wing being divided into a plurality of compartments by radially and longitudinally extending partitions 25, there being eight of such partitions shown in Figure 3, thereby dividing the wing into eight compartments. Each of the compartments contains an inflatable element or bag 26 shaped to conform to the contour of the compartment in which it is located and adapted to contain a buoyancy medium, such as helium gas, which assists in securing and maintaining altitude and which is also utilized, as will presently appear, to preserve equilibrium of the machine in flight.

The rear portion of the fuselage is separated from the cockpit by a hinged door 27 and is divided by longitudinally extending partitions 28 into a plurality of compartments each of which is adapted to receive an inflatable bag 29 also utilized to contain a buoyancy medium. Suspended below the lower wings on opposite sides of the cockpit 16 are tanks 30 divided into compartments by partitions 31 for the storage of a buoyancy medium which may be maintained therein under pressure, said tanks constituting pontoons for the machine when in water.

Situated within the cockpit between the upper wings is an engine, conventionally illustrated by the numeral 32, which drives a propeller 33 mounted upon a vertical shaft 34, said propeller being utilized to attain elevation of the machine in a vertical plane.

A system of piping is employed to connect the various inflatable elements 26, 29 and tanks 30 for the purpose of supplying gas thereto and of transferring gas from the elements in the wings on one side of the fuselage to those in the wings on the other side and for transferring gas from the tanks 30 to the elements 29 and vice versa. This system of piping, as shown in Figure 4, comprises an inlet 35 joined to pipes 36 and 37 which are in turn connected to couplings 38 and 39, respectively, and which are provided with valves 40 and 41 employed to control the flow of gas through said pipes. The elements 26 in the upper and lower wings 17 and 19 are connected to a common pipe 42, while the inflatable elements in the wings 18 and 20 are similarly connected to a common pipe 43. The pipe 42 is joined to the couplings 38 and 39 by pipes 44, 45 provided with the valves 46 and 47, while the pipe 43 is connected to said couplings by pipes 48 and 49 also having valves 50 and 51. A common pipe 52 leads from the various elements 29 to the coupling 39 and the flow of gas through this pipe is controlled by the valve 53. A branch pipe 54 extends from the pipe 52 and is connected to the coupling 38, said branch pipe also having a valve 55. Two pumps 56 and 57 are joined by pipes 58 and 59 to the couplings 38 and 39 and by means of valves 60 either of said pumps may be operatively connected to said couplings. The pumps are driven by an electric motor 61 (Figure 5), or may be hand operated, as indicated in the latter figure. The tanks 30 are joined by a common pipe 62 which is in turn connected to the couplings 38 and 39 by pipes 63 and 64 having valves 65 and 66. Each of the common connections 35, 42, 43, 52 and 62 may be provided with a gauge 67 to indicate the pressure of gas flowing through said connections.

When filling the elements 26 in the various wings through the connection 35, one of the pumps 56 or 57 is operated and the valves 40, 47 and 51 are opened and at the same time the elements 29 may be inflated by opening the valve 53. Simultaneously the tanks 30 may be filled by opening the valves 66. During the filling operation the gas enters the coupling 38 through the pipe 36, is passed through the operating pump into the coupling 39 and from thence flows through the pipes 45, 49, 52 and 64. The gas may be exhausted from the elements 26 and 29 and the tanks 30 by opening, respectively, the valves 46, 50, 55 and 65 whereupon the gas from said elements will flow outwardly into the coupling 38 and from thence through the operating pump to the coupling 39. The valve 41 in the pipe 37 then being opened the gas will flow outwardly through the pipe 37 to the common connection 35.

Should it be desirable, while in flight, to impart more buoyancy to the wings on either side of the fuselage by reason of transverse tilting of the machine, this may be done by manipulating certain of the valves to transfer the gas in the elements 26 of one set of wings to the similar elements in the other set. For instance, if it is necessary to transfer gas from the wings connected to the pipe 42 to those joined to the pipe 43 the switch 68 (Figure 5) of the control unit 69 is thrown to operate the motor 61 and consequently one of the pumps 56 or 57 and the valves 46 and 51 are then opened. This will permit the gas from the pipe 42 to flow through the pipe 44 into the coupling 38, from thence through the operating pump to the coupling 39 and finally through the pipe 49 to the connection 43. In the event that it is desired to reverse this flow the valves 47 and 50 are opened, permitting the gas to flow from the connection 43 through the pipe 48, coupling 38, the operating pump, the coupling 39 and through the pipe 45 to the connection 42. To supply more gas from the tanks 30 to the elements 29 in the fuselage the valves 65 and 53 are opened thereby permitting the flow of the gas through the pipe 63, the coupling 38, the operating pump, the coupling 39 and the pipe 52. The reversal of this flow from the elements 29 to the tanks 30 is accomplished by opening the valves 55 and 66.

The connections of the pipe 43 to the two wings 18 and 20 are shown in Figure 2 and it will be understood that the same connections exist with respect to the wings 17 and 19 which are joined to the pipe 42. As shown in Figure 2, the pipe 43 is provided with the branches 70 and 71 leading, respectively, to the upper and lower wings 18 and 20. The upper end of the branch 70 terminates in a common coupling 72 which is in turn connected to the various individual elements 26 in the upper wing by means of short pipes (not shown). Also joined to the coupling are a plurality of gauges 73 each of which is individual to one of the elements 26 and each gauge is controlled by a three-way valve 74 which may be operated to connect the gauge directly to the short pipe leading to its associated element 26, said valve thereby acting to disconnect the gauge from the common pipe 70. In this manner the pressure within any one of the elements 26 may be ascertained on its individual gauge. The coupling 72 and the various gauges are supported on a plate 75 which is disposed on the inner side of the closure 24 which has an opening 76 through which the various gauges are visible. This same construction is employed in connection with the other wings 17, 19 and 20 and also in connection with the elements 29, the gauges for the latter elements being supported upon the closure 27, as shown in section in Figure 2.

As shown in Figures 4 and 5 the various valves described in connection with the piping system are mounted upon the control unit 69 which also supports the levels 77 and 78 which the operator may observe to determine the longitudinal and transverse inclinations of the machine while in flight. A compass 79 may also be mounted upon the unit 69 to be employed in navigating the machine.

Figure 7:
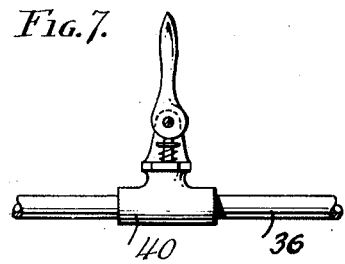
Figure 7 is an elevation of one form of valve utilized in the piping system.
Figure 8:
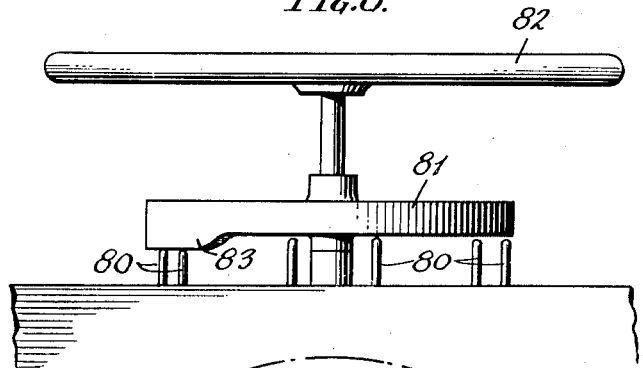
Figure 8 is a side elevation of a different form of control unit from that shown in Figure 5.
Figure 9:
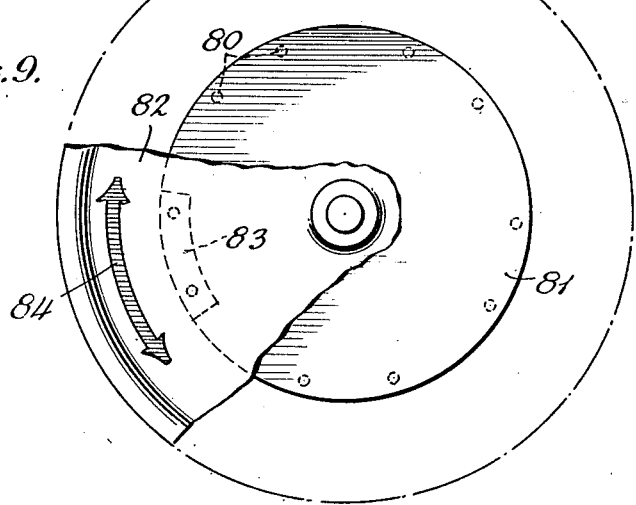
Figure 9 is a top plan view, partly broken away, of the unit shown in Figure 8.
Figure 10:
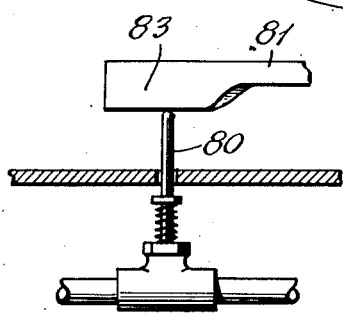
Figure 10 is a fragmentary sectional view illustrating the manner of controlling the valves of the unit shown in Figures 8 and 9.
Figure 11:
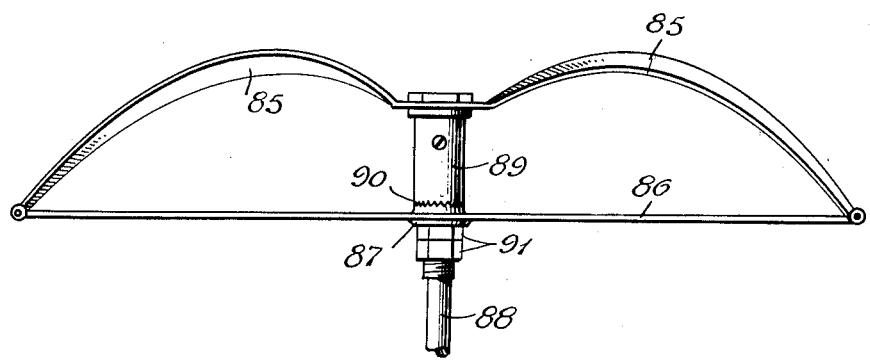
Figure 11 is a side elevation of a form of propeller used in connection with the invention.
Figure 12:
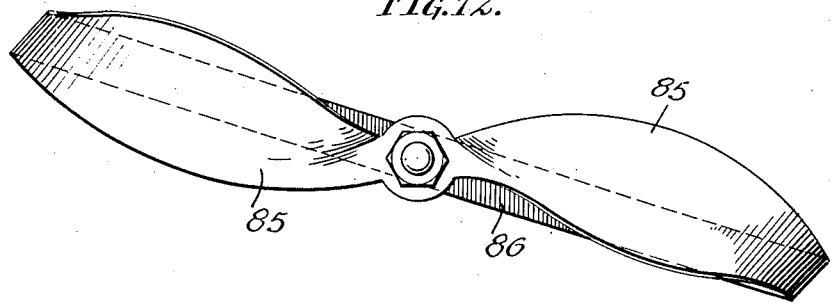
Figure 12 is an end view thereof.
Figure 13:
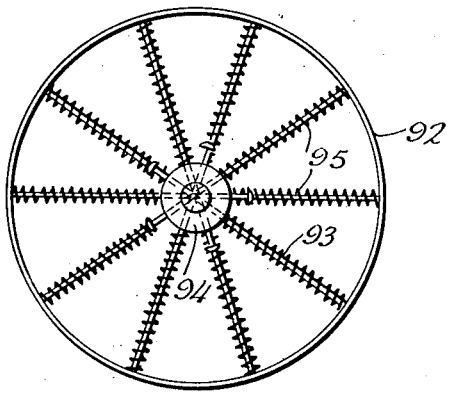
Figure 13 is a side elevation of a wheel constituting a part of the landing gear of the machine.
Figure 14:
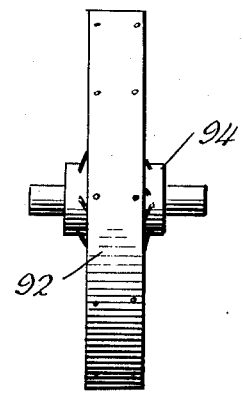
Figure 14 is a front view of said wheel.

In Figures 8, 9 and 10 there is shown a different means for controlling the various valves of the piping system. In this instance the valves, instead of being provided with a pivoted handle, as shown in Figure 7, consist simply of the spring pressed stems 80. These various stems are positioned in pairs beneath a circular cam plate 81 rotated by means of a hand-wheel 82. As indicated in Figure 4, the valves for controlling the flow of gas from one set of wings to the other and from the tanks 30 to the elements 26 and also for controlling the outflow and inflow of the gas to and from the connection 35, are arranged in pairs. Thus the valves 46 and 51 which are opened to permit passage of the gas from the connection 42 to the connection 43 are grouped at the left-hand end of the control unit, while the valves 47 and 50 utilized to reverse said flow are at the right-hand end of said control unit. In the same manner the valve stems corresponding to the various valves are grouped in pairs beneath the plate 81 so that the cam portion 83 thereof may be simultaneously engaged with two of the stems to force the same downwardly and thereby open the required pair of valves. The hand-wheel 82 may be provided on the top thereof with an arrow 84 to indicate the position of the cam portion 83.

The propellers 23 and 33 may be of the same construction and each includes flexible blades 85 the extremities of which are connected by a bar 86 carrying a collar 87 which encircles the shaft 88 of the propeller. By rotating the bar 86 relative to the shaft the blades 85 may be given a torsional twist to vary the pitch thereof. The collar 87 and a sleeve 89 are provided with cooperating ratchet teeth 90 which may be engaged with each other to retain the bar 86 in its adjusted position and to lock said bar in such position nuts 91 are threaded upon the shaft 88 and engaged with the collar 87 to clamp together the cooperating teeth 90.

The landing gear of the machine may include wheels 92 supported from the tanks 30. Each wheel has its spokes 93 secured to the rim of the wheel at their outer ends and extended through the hub 94 at their inner ends with springs 95 interposed between said hub and rim to provide a resilient construction which will assist in absorbing shocks. Within the cockpit 16 there is provided a spraying device comprising a tank 96 adapted to contain liquid under pressure and having an outlet 97 extending through the bottom of the cockpit and also a valved connection 98 to which a hose may be secured.

What is claimed is:

1. In a flying machine, a fuselage having inflatable means therein, wings extending on opposite sides of said fuselage and having compartments therein, inflatable elements within said compartments, tanks suspended from said fuselage in which a gas is stored, means for transferring the gas from the inflatable elements of one wing to those of another wing, and means connecting said tanks with the inflatable means in said fuselage whereby the gas from said tanks may be supplied to the latter means.

2. In a flying machine, a fuselage having longitudinal partitions therein dividing the same into a plurality of compartments, an inflatable bag in each of said compartments, wings extending on opposite sides of said fuselage and having radially extending partitions therein dividing the same into compartments, inflatable bags in the compartments of said wings, tanks suspended from said fuselage, means for transferring a gas from the inflatable bags of one wing to those of another wing, and means connecting said tanks with the bags in said fuselage whereby gas from the tanks may be supplied to the last named bags.

3. In a flying machine, a fuselage having longitudinal partitions therein dividing the same into a plurality of compartments, an inflatable bag in each of said compartments, wings extending on opposite sides of said fuselage and having radially extending partitions therein dividing the same into compartments, inflatable bags in the compartments of said wings, tanks suspended from said fuselage, means for transferring a gas from the inflatable bags of one wing to those of another wing, means connecting said tanks with the bags in said fuselage whereby gas from the tanks may be supplied to the last named bags, and a pump for forcing the gas from one wing to another and from said tanks to the inflatable bags in said fuselage.

In testimony whereof I have affixed my signature.

PETAR JOHN LUCICH.